Feb. 17, 1925.
J. HILLSON
ANTIGLARE SHIELD
Filed Oct. 7, 1924
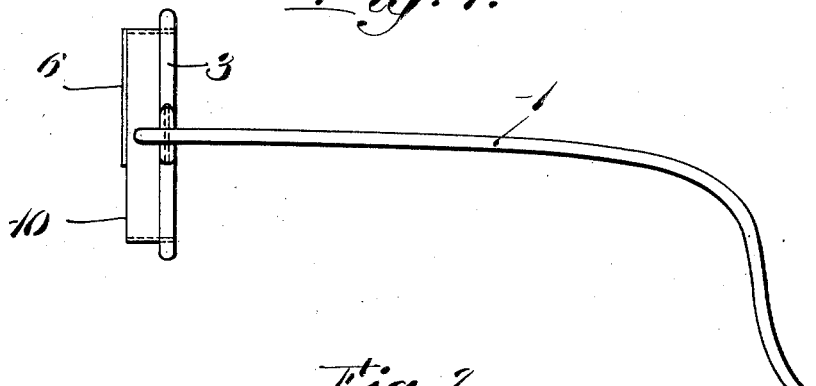
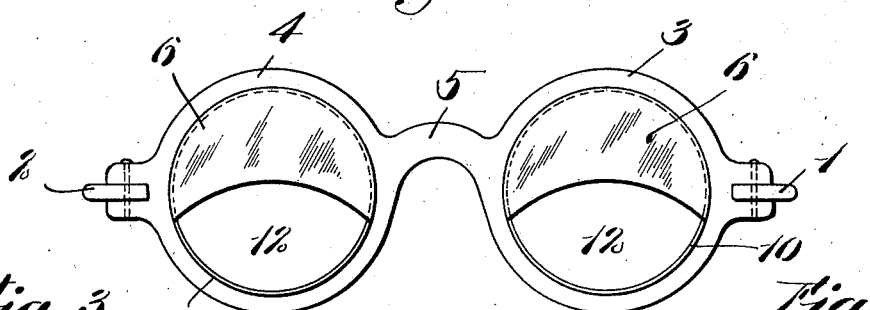
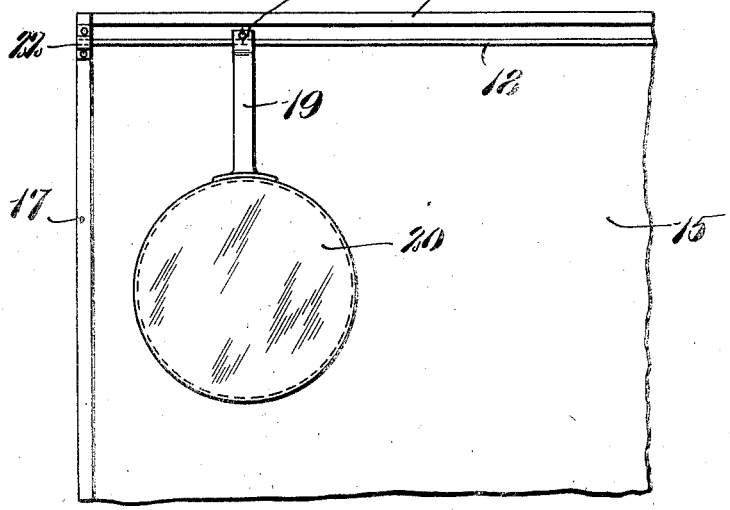
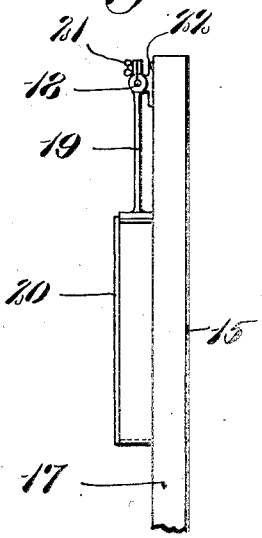
Inventor:
Jacob Hillson
by James R. Hodder
atty.

Patented Feb. 17, 1925.

1,526,855

UNITED STATES PATENT OFFICE.

JACOB HILLSON, OF NEWTON, MASSACHUSETTS.

ANTIGLARE SHIELD.

Application filed October 7, 1924. Serial No. 742,143.

*To all whom it may concern:*

Be it known that I, JACOB HILLSON, a citizen of the United States, and resident of Newton, in the county of Middlesex and State of Massachusetts, have invented an Improvement in Antiglare Shields, of which the following description, in connection with the accompanying drawings, is a specification, like reference characters on the drawings representing like parts.

My present invention is a novel and improved device for protecting the eye-sight from glaring searchlights, headlights or the like, particularly for use in driving automobiles, and protecting the vision of the driver against the blinding glare of headlights approaching from the opposite directions.

In my present invention I have devised a construction of vision protecting glare shields which will also permit the side vision of the driver to be unobstructed, as well as the main field of front vision, and yet protecting the eye-sight from the direct glare of approaching headlights. Heretofore it has been customary to provide various kinds of light shields or antiglare shields, which were either affixed directly in a spectacle frame for the wearer's use, like a pair of eye-glasses, or for positioning on the windshield of the driver's automobile. Such prior devices, however, obstructed the vision of the wearer or user, not only in the direct line of front view, but also against any lateral or side line of vision, and were therefore objectionable, and in effect a source of danger because rendering objects or persons at the side of the driver's vehicle not in the driver's view. My invention permits the glare shield feature to be utilized, while yet allowing a full vision of the driver, both laterally or sidewise, as well as in front, in the entire field which is not in line with the rays of light from approaching vehicles.

I believe that my provision of anti-glare shields, permitting a full view laterally, as well as at other points in front of the user, limiting the anti-glare feature to the lines of light from approaching cars, is distinctly new, and I wish to claim the same herein broadly.

In carrying out my present invention I position the glare shielding feature—such as green or colored glass, celluloid or the like, in spaced relation with the eye of the wearer, so that there will be provision for sight laterally between the position of the colored or glare shield portion and the wearer's eye.

Further features of the invention, important objects and advantages will be hereinafter more fully pointed out and claimed.

Referring to the drawings, illustrating preferred embodiments of my present invention, Fig. 1 is a side view of a pair of spectacles utilizing my invention;

Fig. 2 is a front view;

Fig. 3 is a front view of a windshield and adjustable glare shield embodying my invention positioned thereon;

Fig. 4 being a side view of the device as shown in Fig. 3.

Referring to the drawings, I provide a frame spectacle which may be of any material and any size, design or other construction, preferably being of celluloid or other light material and comprising a pair of bows 1 and 2, rims 3 and 4, and connecting nose piece 5. To the rims 3 are applied the glare shield members 6, 6, of colored glass, celluloid or the like, and preferably in partial position only on the rim, and spaced therefrom. This spacing may be effected in any desired manner, such for example as by a thin supporting cylindrical member 10 of celluloid or other transparent material, which member 10 may be fitted into the rims 3 and 4 and carry the glare shields 6 and 6 upon the outer surface. This construction provides a protecting glare shield for the vision of the wearer while spacing the same sufficiently from the eye to permit lateral and side vision through the circular member 10 and also full forward vision through the portions 12 of the rims 3 and 4 not obscured by the glare shields 6 and 6. By this arrangement, therefore, the driver is permitted to have a full and clear view back of the glare shield portion, permitting normal sight at the sides of his vehicle, as well as ahead and below the line of glaring headlights, thereby insuring greater ease, confidence and safety in driving because of clearer vision while protecting the eye-sight of the driver in the desired line of glare against approaching headlights.

In the forms shown in Figs. 3 and 4, I have illustrated a modified form of glare shield positioned in front of the windshield 15 of an automobile. In this arrangement the supporting frameworks 16 and 17 of the windshield may carry a rod 18 on which is a swinging arm 19 carrying a glare shield 20 of colored glass, celluloid or the like and adapted to be swung in and out of position by rotation of the arm 20 on a rod 18. This can be readily accomplished by any suitable friction clamp between the arm 19 and rod 18, such for example as shown at 21. The rod 18 being held in supporting brackets 22 at either end of the automobile windshield, permits the arm 19 to be moved longitudinally and swung upwardly or downwardly into position. The glare shield 20 is held in position substantially remote from the windshield 15, thereby permitting a substantial space between the glare shield portion 20 and the windshield 15. While this arrangement permits free vision of the operator from the eye back of the glare shield 20, it also spaces the glare shield portion 20 from the windshield and aids in dispelling reflections and distortions of vision through the windshield 15. In both forms of my invention, the vision of the driver is enlarged and freed of the obstructions afforded by the colored glare shields 6, 6 or 20, excepting only in the substantial line of rays of light from approaching cars, and particularly is the driver's vision unobstructed at the sides, which is a most important feature in articles of this class.

My invention is further described and defined in the form of a claim as follows:

Anti-glare glasses having supporting rims, glare shields of colored material partially across said rims and transparent supporting means holding the shields spaced from said rims to permit unobstructed vision of the operator at the sides of said glare shields.

In testimony whereof, I have signed my name to this specification.

JACOB HILLSON.